(12) United States Patent
Mednik et al.

(10) Patent No.: US 8,130,519 B2
(45) Date of Patent: Mar. 6, 2012

(54) LED DRIVER WITH LOW HARMONIC DISTORTION OF INPUT AC CURRENT AND METHODS OF CONTROLLING THE SAME

(75) Inventors: Alexander Mednik, Campbell, CA (US); Rohit Tirumala, Sunnyvale, CA (US); Marc Tan, Sunnyvale, CA (US)

(73) Assignee: Supertex, Inc., Sunnyvale, CA (US)

( * ) Notice: Subject to any disclaimer, the term of this patent is extended or adjusted under 35 U.S.C. 154(b) by 698 days.

(21) Appl. No.: 12/269,512

(22) Filed: Nov. 12, 2008

(65) Prior Publication Data
US 2010/0118572 A1    May 13, 2010

(51) Int. Cl.
*H02M 7/5383* (2007.01)
*H02M 5/42* (2006.01)

(52) U.S. Cl. ............................... 363/74; 363/90
(58) Field of Classification Search .............. 363/74, 363/84, 90
See application file for complete search history.

(56) References Cited

U.S. PATENT DOCUMENTS

| 6,166,528 | A * | 12/2000 | Rossetti et al. | 323/283 |
|---|---|---|---|---|
| 6,295,217 | B1 * | 9/2001 | Yang et al. | 363/49 |
| 7,750,616 | B2 * | 7/2010 | Liu | 323/285 |
| 2007/0120506 | A1 * | 5/2007 | Grant | 315/312 |
| 2009/0315473 | A1 * | 12/2009 | Tsai et al. | 315/291 |

* cited by examiner

*Primary Examiner* — Matthew Nguyen
*Assistant Examiner* — Emily Pham
(74) *Attorney, Agent, or Firm* — Weiss & Moy, P.C.; Jeffrey D. Moy

(57) ABSTRACT

A power supply circuit for powering a load at constant current has a rectifier stage for receiving an AC voltage input and for producing a first substantially DC voltage. A first capacitor is attached to the load. A charge-pump is attached to an output of the rectifier stage and to the load for providing power factor correction and for converting the first substantially DC voltage to a second substantially DC voltage at the first capacitor. The charge pump is prevented from conducting energy back into the output of the rectifier stage. The charge pump delivers energy to a charge pump output, the energy being delivered directly instead of being stored. A converter stage is attached to the load and the first capacitor. The converter stage is used for converting voltages at the first capacitor and the charge pump to an output DC current. The converter stage has a switch for periodically connecting a first series-coupled circuit of the charge pump to the output of the rectifier stage.

16 Claims, 3 Drawing Sheets

LED DRIVER WITH LOW HARMONIC DISTORTION OF INPUT AC CURRENT AND METHODS OF CONTROLLING THE SAME

RELATED APPLICATION

The present patent application is related to U.S. Provisional Application Ser. No. 61/047,286, filed Apr. 23, 2008, in the name of the same inventors listed above, and entitled, "LED DRIVER WITH LOW HARMONIC DISTORTION OF INPUT CURRENT AND METHOD OF CONTROLLING THE SAME". The present patent application claims the benefit under 35 U.S.C. §119(e).

BACKGROUND

The present invention relates generally to a Light Emitting Diode (LED) driver and, more specifically, to a single-stage non-isolated switching converter capable of high-efficiency operation, low harmonic distortion of the AC line current, high reliability and long life in the presence of an elevated ambient temperature.

Recent developments of high-brightness light emitting diodes (LED) have opened new horizons in lighting. Highly efficient and reliable LED lighting continuously wins recognition in various areas of general lighting, especially in areas where cost of maintenance is a concern. One example of such application is in street lighting where LED lighting is becoming increasingly popular throughout the world.

These applications have created demand for a special LED driver, a current-regulated power supply circuit, which can match the long life of LEDs. A typical set of requirements to such LED driver includes high power efficiency, power factor correction (PFC) and low distortion of the input AC current. Due to high power dissipation within LEDs themselves, the LED driver must be capable of continuous operation at elevated ambient temperature. Non-isolated LED driver topologies are typical for these types of applications, since galvanic safety isolation of the LED load from AC mains is not generally required.

However, prior art LED drivers generally employ two-stage power conversion, wherein the first stage, typically a boost converter, is responsible for AC-to-DC rectification featuring power factor correction and low harmonic distortion of the AC line current, and the second stage is a constant output current DC-to-DC converter. One obvious disadvantage of such approach is its higher cost and component count compared to a single-stage power supply. Since the overall efficiency of such an LED driver is the product of the efficiency of each conversion stage, achieving high efficiency can be difficult with a two-stage approach.

Therefore, it would be desirable to provide a circuit and method that overcomes the above problems. The circuit would be a single-stage non-isolated switching converter capable of high-efficiency operation, low harmonic distortion of the AC line current, high reliability and long life in the presence of an elevated ambient temperature.

SUMMARY

A power supply circuit for powering a load at constant current has a rectifier stage for receiving an AC voltage input and for producing a first substantially DC voltage. A first capacitor is attached to the load. A charge-pump is attached to an output of the rectifier stage and to the load for providing power factor correction and for converting the first substantially DC voltage to a second substantially DC voltage at the first capacitor. The charge pump is prevented from conducting energy back into the output of the rectifier stage. The charge pump delivers energy to a charge pump output, the energy being delivered directly instead of being stored. A converter stage is attached to the load and the first capacitor. The converter stage is used for converting voltages at the first capacitor and the charge pump to an output DC current. The converter stage has a switch for periodically connecting a first series-coupled circuit of the charge pump to the output of the rectifier stage.

A method of controlling an output current of a power supply circuit comprising a first converter stage for receiving an input voltage, a second converter stage delivering a regulated output current, a controlled switch for conducting the input current and the output current, the method comprising: detecting a portion of the input current conducted by the controlled switch; detecting a current in the controlled switch; deriving a difference between the current in the controlled switch and the portion of the input current conducted by the controlled switch; and maintaining the difference at a reference level.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
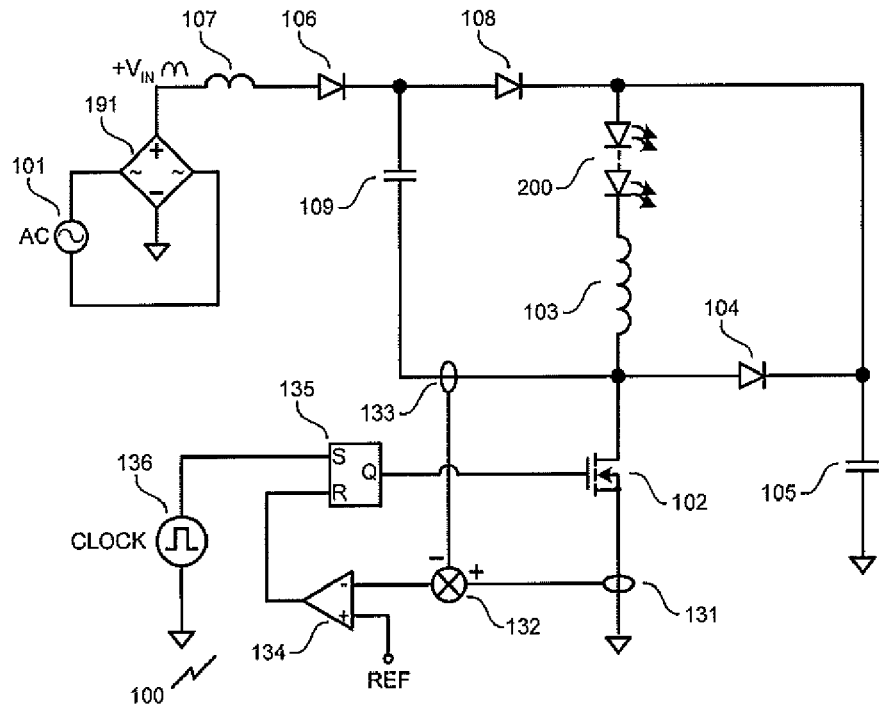
FIG. 1 shows a simplified schematic of an LED driver of the present invention for powering an LED load at constant current.

Referring to FIG. 11 an LED driver 10 of the present invention is shown. The LED driver 10 is used for powering an LED load 200 at constant current wherein the LED driver 10 receives input power from an AC voltage source 101 and delivers constant-current output to the LED load 200. The LED driver 10 has a rectifier circuit 191 attached to the AC voltage source 101. A charge pump circuit 120 is attached to the rectifier circuit 191. In the embodiment depicted in FIG. 1, the charge pump circuit 120 comprises a flying capacitor 109, a resonant inductor 107, diodes 106 and 108. The resonant inductor 107 has a first terminal attached to the rectifier circuit 191. A second terminal of the resonant inductor 107 is attached to a first terminal of the diode 106. A second terminal of the diode 106 is attached to a first terminal of the flying capacitor 109 and to the first terminal of the diode 108. A second terminal of the diode 108 is attached to the load 200.

A buck converter stage 202 is coupled to a second terminal of the flying capacitor 109, the load 200 and to the second terminal of the diode 108. In the embodiment depicted in FIG. 1, the buck converter stage 202 includes a power switch 102, a freewheeling diode 104 and an output smoothing inductor 103. A first terminal of the output smoothing inductor 103 is coupled to the load 200. A second terminal of the output smoothing inductor 103 is attached to the second terminal of the flying capacitor 109. A first terminal of the freewheeling diode 104 is coupled to the second terminals of the output smoothing inductor 103 and the flying capacitor 109. A second terminal of the freewheeling diode 104 is attached to the load 200 and to the first terminal of a hold-up capacitor 105 which is grounded. The power switch 102 has a first terminal attached to the first terminal of the freewheeling diode 104, and the second terminals of the flying capacitor 109 and the output smoothing inductor 103. A second terminal of the power switch 102 is attached to a switching control circuit 100. A third terminal of the power switch 102 is grounded.

In the embodiment depicted in FIG. 1, the switching control circuit 100 comprises current sensors 131 and 133, a summation element 132, a current comparator 134 with a current reference REF, an oscillator circuit 136 and a latch 135. The current sensor 131 is attached to the third terminal of the power switch 102 which is grounded. The current sensor 133 is attached to the second terminals of the output smoothing inductor 103 and the flying capacitor 109. The summation element has a first terminal attached to the current sensor 133, a second terminal attached to the current sensor 131 and a third terminal attached to an input of the current comparator 134. A second input of the current comparator 134 is attached to a reference current REF. The output of the current comparator 134 is attached to the latch 135. In the embodiment shown in FIG. 1, the latch 135 is a Pulse Width Modulation (PWM) latch wherein the S input is attached to the oscillator circuit 136 and the R input is attached to the output of the current comparator 134. The output of the RS latch 134 is attached to the second terminal of the power switch 102.

In operation, rectifier 191 receives the AC line voltage 101 and delivers the full-wave rectified voltage VIN. There are two modes of operation within the half-cycle of the AC voltage 101. The first mode occurs when VIN is less than or equal to half the voltage at the hold-up capacitor 105, the second mode occurs when VIN is more than half of said voltage.

In the first mode of operation, when the switch 102 is turned on by the control circuit 100, capacitor 109 charges resonantly via inductor 107 and diode 106 to approximately double of VIN. Subsequently, the current in inductor 107 falls to zero, and diode 106 becomes reverse-biased. At the same time while switch 102 is on, LED load 200 receives current from capacitor 105 via output smoothing inductor 103. The diodes 108 and 104 are reverse-biased in this operating mode. When control circuit 100 turns off power switch 102, the inductor 103 current is diverted from switch 102 into capacitor 109 via diode 108. As soon as this capacitor 109 has been discharged fully, diode 104 becomes forward-biased and conducts the inductor 103 current.

In the second mode of operation, the voltage on capacitor 109 does not double, but instead will be clamped to the voltage on the hold-up capacitor 105 by the action of diode 108. The remaining energy of inductor 107 causes delivery of energy from inductor 107 and the AC source 101 directly into capacitor 105 via diodes 106 and 108, until the current in inductor 107 has, at more or less constant rate, fallen to zero, and diode 106 becomes reverse-biased. The remainder of the operation is similar to that disclosed above for the first mode of operation.

In operation of the control circuit 100, oscillator 136 sets latch 135 and switch 102 is activated. At this moment, the current registered by current sensor 131 is the superposition of the current in inductor 103 and the current in capacitor 109. Summation element 132 subtracts the capacitor 109 current signal registered by sensor 133 from the one registered by sensor 131 and delivers a current signal reflecting the inductor 103 current only. When this signal exceeds the reference level REF, the output of comparator 134 changes state, and latch 135 turns switch 102 off. The cycle repeats itself upon the next clock pulse of oscillator 136

Since charge-pump current is largely proportional to VIN, the LED driver 10 of FIG. 1 achieves low harmonic distortion of the input AC current. In case the charging of capacitor 109 ends before the switch 102 turns off, the charge pump circuit does not increase switching loss in switch 102. Moreover, the turn-off of switch 102 occurs at zero voltage, since the voltage slew rate is limited by relatively slow discharging rate of capacitor 109.

Figure 2:
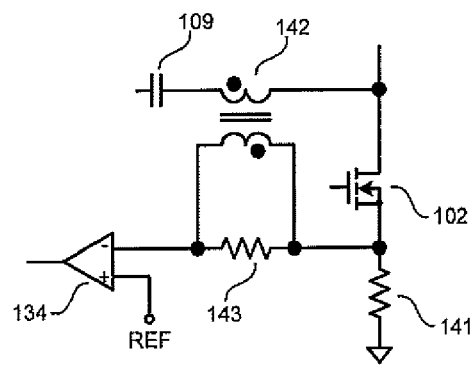
FIG. 2 shows a simplified schematic of one embodiment of the summation circuit shown in the LED driver depicted in FIG. 1.

Referring now to FIG. 2, one embodiment of the summation circuit 132 depicted in FIG. 1 is shown. The summation circuit 132 comprises a current sense resistor 141, a current sense transformer 142 and a pair of resistors 141 and 143. The current sense resistor 141 is placed in series with the power switch 102. The current sense transformer 142 is placed so that the primary winding of the current sense transformer 142 is in series with the flying capacitor 109 and the secondary winding is burdened with the resistor 143. Resistors 141 and 143 are connected in series, and the total voltage across the resistors 141 and 143 is applied at the signal input of current sense comparator 134. The polarity of the current sense transformer 142 winding connection is such that the comparator 134 input voltage is independent of the current in the capacitor 109.

Figure 3:
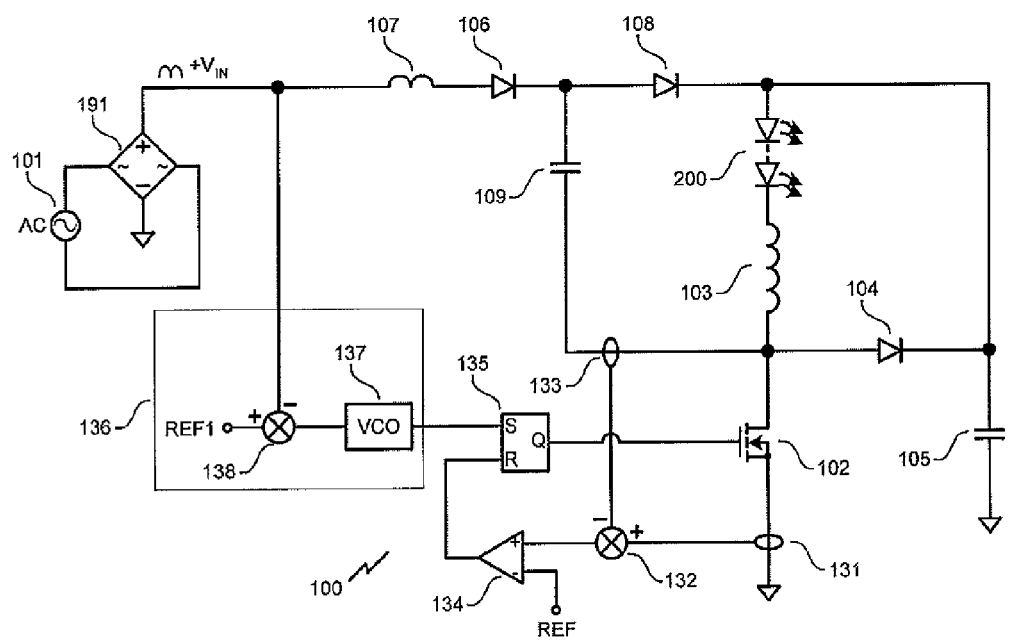
FIG. 3 shows the LED driver of FIG. 1 using second-harmonic voltage injection in the oscillator circuit.

Referring now to FIG. 3, another embodiment of the LED driver 10A is shown. The LED driver 10A is similar to the LED driver 10 of FIG. 1. The LED driver 10A of the present embodiment uses second-harmonic voltage injection in the oscillator circuit 136. In the present embodiment, the oscillator 136 comprises a voltage controlled oscillator (VCO) block 138 and a summation element 137. The VCO block 137 is attached to the S input of the latch 135. The summation element 136 has a first terminal attached to the VCO block 137, a second terminal attached to the rectifier 191 and the inductor 107, and a third terminal attached to the reference signal REF1. In operation, the oscillator 136 outputs switching frequency proportional to the difference between a reference signal REF1 and voltage at the output of rectifier 191.

Figure 4:
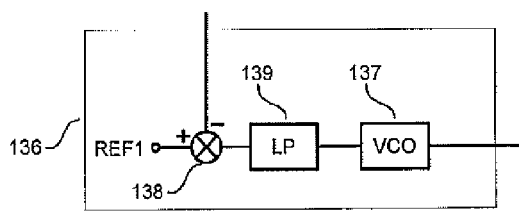
FIG. 4 shows the LED driver of FIG. 3 wherein the oscillator includes a low-pass filter to create phase shifted modulation of its output frequency with respect to the output voltage of the rectifier.

Referring now to FIG. 4, another embodiment of the oscillator 136 is shown. The oscillator 136 in this embodiment is similar to that shown in FIG. 3. In the present embodiment, the oscillator 136 includes a low-pass filter 139 at the input of VCO 138. The low-pass filter creates a phase shifted modulation of its output frequency with respect to the output voltage of rectifier 191.

Figure 5:
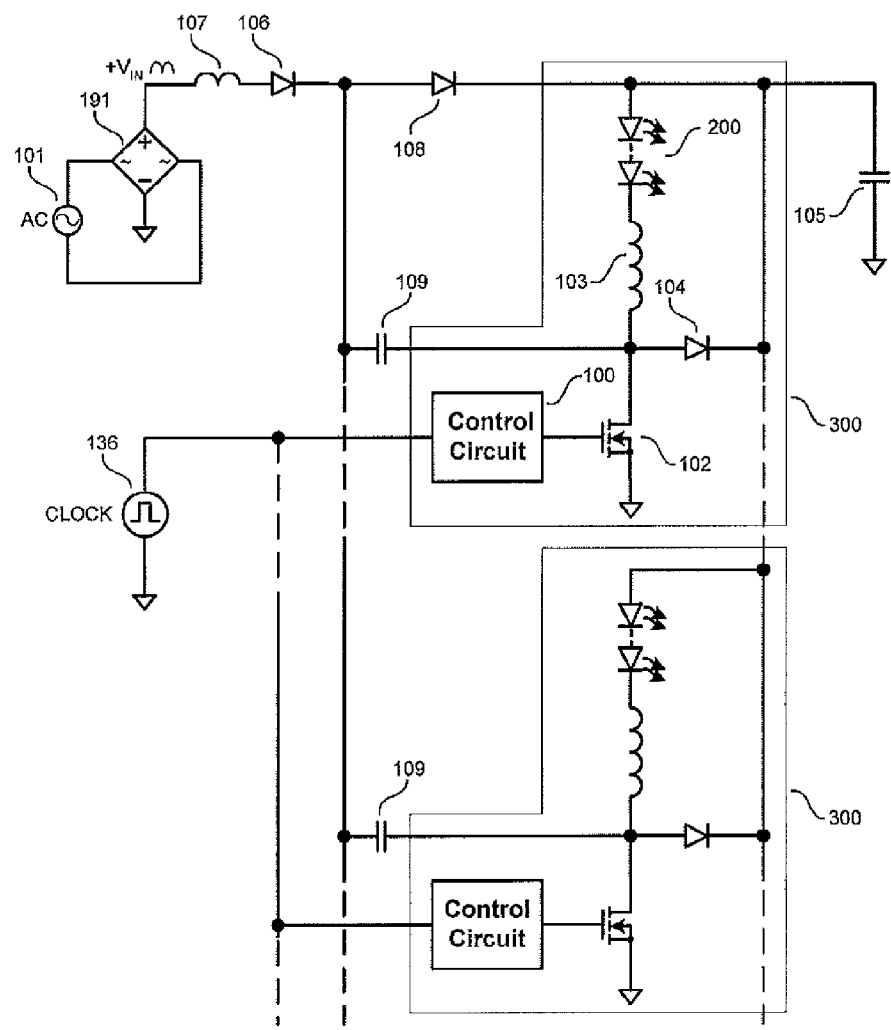
FIG. 5 depicts an LED driver of FIG. 1 wherein the flying capacitor is distributed over a plurality of output buck stages.

Referring now to FIG. 5, another embodiment of the LED driver 10B is shown. The LED driver 10B is similar to that shown in FIG. 1. In FIG. 5, the flying capacitor 109 is distributed over a plurality of output buck stages 300. Each output buck stage 300 comprises a power switch 102, a freewheeling diode 104 and a smoothing inductor 103. Each output buck stage 300 drives a portion of the LED load 200. All control circuits 100 are synchronized with respect to one oscillator 136 in such a way that all power switches 102 turn on simultaneously. The operation of the LED driver 10B of FIG. 5 is identical to the one of FIG. 1.

While embodiments of the disclosure have been described in terms of various specific embodiments, those skilled in the art will recognize that the embodiments of the disclosure can be practiced with modifications within the spirit and scope of the claims.

What is claimed is:

1. A power supply circuit for powering a load at constant current comprising:
   a rectifier stage for receiving an AC voltage input and for producing a first substantially DC voltage;
   a first capacitor attached to the load;
   a charge-pump attached to an output of the rectifier stage and to the load for providing power factor correction and for converting the first substantially DC voltage to a second substantially DC voltage at the first capacitor, the charge pump prevented from conducting energy back into the output of the rectifier stage, the charge pump delivering energy to a charge pump output, the energy being delivered directly instead of being stored; and
   a converter stage attached to the load and the first capacitor for converting voltages at the first capacitor and the charge pump to an output DC current, and having a switch for periodically connecting a first series-coupled circuit of the charge pump to the output of the rectifier stage.

2. A power supply circuit in accordance with claim 1 further comprising a control circuit coupled to the switch for periodically connecting the first series-coupled circuit to the rectifier output.

3. A power supply circuit in accordance with claim 1 wherein the charge-pump comprises:
   the first series-coupled circuit attached to the first capacitor comprising a first inductor coupled in series with a first diode and a second capacitor, the first series-coupled circuit connected to the output of the rectifier stage, whereby the first converter stage is prevented from conducting energy back into said rectifier output;
   a second diode connected in series with the first inductor, the second diode delivering energy from the rectifier and the first inductor into the first capacitor, and the second capacitor delivering energy to the converter stage, the energy in the second capacitor being delivered to the converter stage directly instead of being stored in the first capacitor.

4. The power supply circuit of claim 1, wherein the converter stage is of the buck type.

5. The power supply circuit of claim 3, wherein the converter stage is of the buck type further comprising a second inductor in series with the load, the second inductor and the load receiving energy from the second capacitor when the switch is turned off.

6. The power supply circuit of claim 1, further comprising:
   a first current sensor attached to the switch for detecting current in the switch;
   a second current sensor attached to the second the charge pump;
   wherein the control circuit regulates an output DC current as a function of a difference between an output of the first current sensor and an output of the second current sensor.

7. The power supply circuit of claim 6, wherein the control circuit comprises:
   a reference circuit; and
   a subtraction circuit for subtracting the output of the second current sensor output from the output of the first current sensor output;
   wherein the control circuit regulates the subtraction circuit at a reference level of the reference circuit.

8. The power supply circuit of claim 7, wherein the switch is switched off when the subtraction circuit output exceeds the reference level.

9. The power supply of claim 6, wherein the first current sensor comprises a current transformer.

10. The power supply of claim 6, wherein the second current sensor includes a current transformer.

11. The power supply circuit of claim 7, wherein the control circuit further comprises an oscillator circuit for switching on the switch at a variable frequency rate for shaping an input AC current of the rectifier stage substantially in proportion with the AC voltage.

12. The power supply circuit of claim 11, wherein the oscillator circuit receives the output of the rectifier stage, and wherein the variable frequency is reduced with the output of the rectifier stage increasing.

13. The power supply circuit of claim 11, wherein the control circuit further comprises a low pass filter for attenuating and shifting phase of the output of the rectifier stage and for reducing the variable frequency with the attenuated and phase-shifted voltage increasing.

14. The power supply circuit of claim 1, comprising a plurality of converter stages for powering a plurality of corresponding loads.

15. A power supply circuit invention for powering a load at constant current comprising:
   a rectifier stage for receiving an AC voltage input and for producing a first substantially DC voltage;
   a first capacitor attached to the load;
   a charge-pump attached to an output of the rectifier and to the load for converting the first substantially DC voltage to a second substantially DC voltage at the first capacitor;
   a converter stage attached to the load and the first capacitor for converting voltages at the first capacitor and the charge pump to an output DC current and having a switch for periodically connecting the charge pump to the output of the rectifier stage;
   a first current sensor attached to the switch for detecting current in the switch;
   a second current sensor attached to the charge pump; and
   a control circuit to regulate an output DC current as a function of a difference between an output of the first current sensor and an output of the second current sensor.

16. The power supply circuit of claim 15, wherein the control circuit comprises:
   a reference circuit; and
   a subtraction circuit for subtracting the output of the second current sensor output from the output of the first current sensor output;
   wherein the control circuit regulates the subtraction circuit at a reference level of the reference circuit.

* * * * *